United States Patent
Garbo

(10) Patent No.: US 6,240,836 B1
(45) Date of Patent: Jun. 5, 2001

(54) ALUMINUM FOIL COMPRESSION MOLD AND METHOD OF MOLDING FOOD

(76) Inventor: Paul W. Garbo, 48 Lester Ave., Freeport, NY (US) 11520

(*) Notice: Subject to any disclaimer, the term of this patent is extended or adjusted under 35 U.S.C. 154(b) by 0 days.

(21) Appl. No.: 09/369,161

(22) Filed: Aug. 5, 1999

(51) Int. Cl.[7] ............................... A23P 1/10; A47J 37/00
(52) U.S. Cl. .................... 99/349; 99/353; 99/439; 425/127; 426/523
(58) Field of Search ...................... 99/349, 353, 373, 99/377, 493, 439; 100/317, 318, 244; 425/394, 398, 117, 125, 127, 410, 412; 426/512, 523

(56) References Cited

U.S. PATENT DOCUMENTS

| | | | |
|---|---|---|---|
| 3,669,605 | * | 6/1972 | Reilly ............................... 425/398 |
| 3,711,295 | * | 1/1973 | Zukerman ........................ 426/618 |
| 3,961,087 | * | 6/1976 | Zukerman ........................ 426/262 |
| 4,511,324 | * | 4/1985 | Bauer ............................... 425/398 |
| 4,693,900 | * | 9/1987 | Molinari .......................... 426/128 |
| 4,973,240 | * | 11/1990 | Reilly .............................. 425/195 |
| 5,137,745 | * | 8/1992 | Zukerman et al. .............. 426/618 |
| 5,154,115 | * | 10/1992 | Kian ................................. 99/380 |
| 5,376,395 | * | 12/1994 | Pels ................................. 426/446 |
| 5,960,705 | * | 10/1999 | D'Alterio et al. ............... 99/349 |
| 6,026,737 | * | 2/2000 | D'Alterio et al. ............... 99/349 |

* cited by examiner

*Primary Examiner*—Milton Cano
*Assistant Examiner*—Sherry A. Dauerman
(74) *Attorney, Agent, or Firm*—Paul W. Garbo

(57) ABSTRACT

An aluminum foil mold is placed in a rigid back-up mold with a cavity matching the contour of the foil mold. Fluid food deposited in the foil mold is compressed therein by a mold top that is pressed down against the back-up mold. Heat applied to the back-up mold and mold top flows to the foil mold and fluid food therein to effect baking under pressure. Thus, a unified food product is formed in the foil mold that can protect the food product against handling damage until it is eaten. A foil mold of novel design is used to form a food product shaped like an upside-down pizza shell.

6 Claims, 2 Drawing Sheets

ALUMINUM FOIL COMPRESSION MOLD AND METHOD OF MOLDING FOOD

BACKGROUND OF THE INVENTION

This invention relates to an apparatus and method of molding fluid foods by compression and baking them under pressure. More particularly, the invention involves an aluminum foil mold which is filled with a fluid food that is compressed and baked under pressure into an edible coherent shape.

In recent years. U.S. Pat. No. 4,693,900 to Molinari and U.S. Pat. Nos. 5,283,071 and 5,411,752 to Taylor et al have proposed the formation of coherent products composed of cooked spaghetti and a binding agent. The methods disclosed in these patents are not suited for rapid production of coherent food products in a large-scale operation. The formation of shaped food products from rice and other cereal grains is illustrated in U.S. Pat. Nos. 3,711,295; 3,961,087 and 5,137,745 to Zukerman, but none of these patents suggest any aspect of this invention.

Accordingly, a principal object of the invention is to provide an apparatus and method for molding and baking fluid food under pressure into edible unified shapes.

Another important object is to provide an aluminum foil mold in which fluid food is converted into a desired shaped product, and which serves to protect the shaped food product from handling and shipping damage.

A further object is to provide apparatus that can be automated with minimum mechanical movements.

These and other features and advantages of the invention will be apparent from the description which follows.

SUMMARY OF THE INVENTION

In accordance with this invention, the primary mold is preformed aluminum foil, preferably having a multiplicity of needle punctures that act as vents for volatiles and steam generated during the baking of the fluid food under compression in the foil mold. A secondary or back-up mold having a recess or cavity that nests with the foil mold serves to prevent distortion of the foil mold during compression of the food therein and to facilitate the transfer of heat to the foil mold and its contained food. The back-up mold which is formed of rigid metal, preferably aluminum, is heated by gas flames beneath the mold, or by steam or hot liquid flowing through coils attached to the mold, or by electrical heaters attached to the mold. Electrical heaters are preferred because of structural simplicity and easy temperature control.

With the preformed aluminum foil mold placed in the cavity of the rigid back-up mold and nested therein, a measured quantity of the chosen fluid food that will fill the foil mold is deposited therein, and a mold top is pressed down against the back-up mold so that the foil mold and its food content are completely enclosed. Like the back-up mold, the mold top is also heated. Thus, with the mold top pressed against the back-up mold, heat is rapidly transmitted to both the top and bottom of the compressed food in the foil mold. Fluid food may be deposited in the foil mold before or after it is nested in the back-up mold.

Temperatures in the range of about 300° F. to 500° F. are usually chosen, depending on the food to be baked. At such temperatures and with direct contact of the food with hot metal surfaces, the generation of steam and volatiles is very rapid. To prevent the build-up of troublesome gas pressure, the mold top is permitted to pop up slightly for several successive instants thereby venting gases several times during the baking period. A needle-punctured foil mold coupled with a back-up mold that has holes therethrough provides continuous, gentle venting of gases during the baking period.

A basic and essential element of this invention is the preformed, aluminum foil mold that not only makes it possible to speed up the molding and baking of fluid food into a unified, shaped product but also protects the shaped product against damage from handling and shipping. Aluminum foil, as used herein, means aluminum sheet in the gauges commonly used to make pie pans found with boxed pies sold in supermarkets. Like such pie pans, the aluminum foil mold of this invention is cheap enough to be discarded when it is no longer needed. Tenneco Packaging of Lake Forest, Illinois, offers aluminum foil preforms with "quilted bottoms" and tiny perforations which are illustrative of a preferred type of foil mold used pursuant to this invention.

The foil mold is always concave, usually pan-like but its bottom need not be flat. In fact, a contoured bottom of the foil mold has been designed for producing pizza shells with a thickened rim in the upside-down position. Thus, when such a pizza shell has been baked, the foil mold is inverted so that the pizza shell falls out and the flat face of the baked shell becomes its bottom with the thickened rim of the shell pointing upward. The mold top usually has a flat face for compressing the fluid food within the foil mold, when the mold top is pressed against the back-up mold. However, the face of the mold top may be contoured concavely or convexly to form a baked food product having a decorative pattern.

In most cases, the aluminum foil mold used in this invention is formed with an outward flange which stabilizes the shape of the foil mold and which is tightly held between the back-up mold and the mold top during the baking period. The usual, crimped flange of an aluminum foil mold allows the escape of gases from the compressed food undergoing baking in the closed mold. The crimped flange has tiny, radial creases through which the gases leak out of the hot mold. The flange of the foil mold may have a "curl" edge. In such case, the back-up mold and/or the mold top will have a groove in which the "curl" fits while the mold top is pressed against the back-up mold. The back-up mold and mold top are most frequently made of aluminum because of reasonable cost and good thermal conductivity. Copper is a good alternative metal.

The term, fluid food, is used herein to embrace loose granular food particles like boxed stuffing sold in supermarkets, or pieces of cooked pasta such as linguini admixed with an aqueous binding agent, or a batter that may contain chopped nuts or whole grains, or plastic food like mashed potatoes or dough. Pieces of food introduced in the mold, such as cut linguini, preferably have a length not exceeding about 3 inches. In short, fluid food means any food ingredients that are fluent, flowable or deformable and therefore moldable under compression.

The mold top which is alternately pressed down against the back-up mold and lifted away therefrom, can be so moved by a vertically acting hydraulic or pneumatic piston, the latter being usually preferred. The deposition of a measured quantity of fluid food in the foil mold while the mold top is lifted can be performed manually or by any known metering device that mechanically moves between the raised mold top and foil mold and quickly moves away after depositing the fluid food in the foil mold. Known timing devices are available to provide automatic movement of the mold top and the metering device to fill the foil mold in a desired sequence repetitively.

BRIEF DESCRIPTION OF THE DRAWINGS

For further clarification of the invention, the following description will refer to the appended drawings of which.

DESCRIPTION OF PREFERRED EMBODIMENTS

Figure 1:
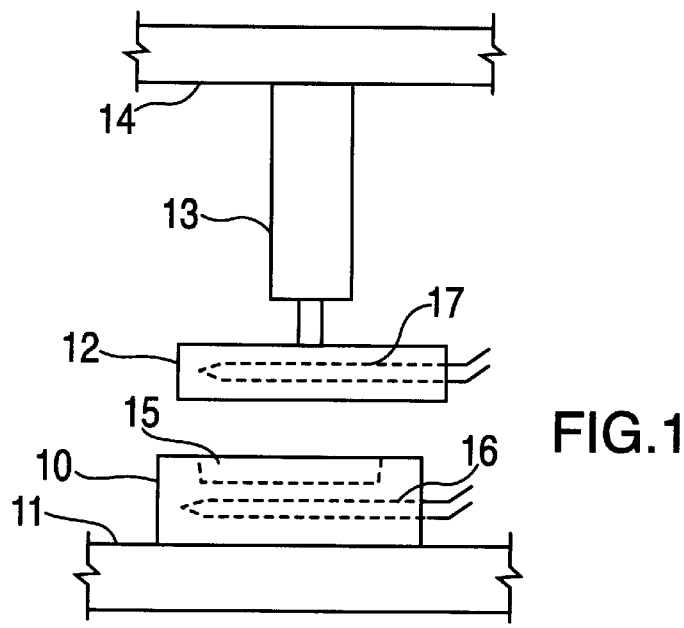
FIG. 1 is a vertical view of a simple embodiment of the apparatus of the invention.

FIG. 1 shows the molding and baking apparatus of the invention, the basic parts being bottom or back-up mold 10 anchored to support member 11, and mold top 12 fastened to the piston rod of pneumatic cylinder 13 which is suspended from overhead beam 14. Mold 10 has a cylindrical recess 15 on its upper or molding side, designed to receive an aluminum foil mold 18 (shown in FIG. 2). Back-up mold 10 made of aluminum has electrical heating element 16 embedded therein but other types of heaters may be used. Similarly, mold top 12 made of thermally conductive metal is equipped with electrical heater 17.

Figure 2:
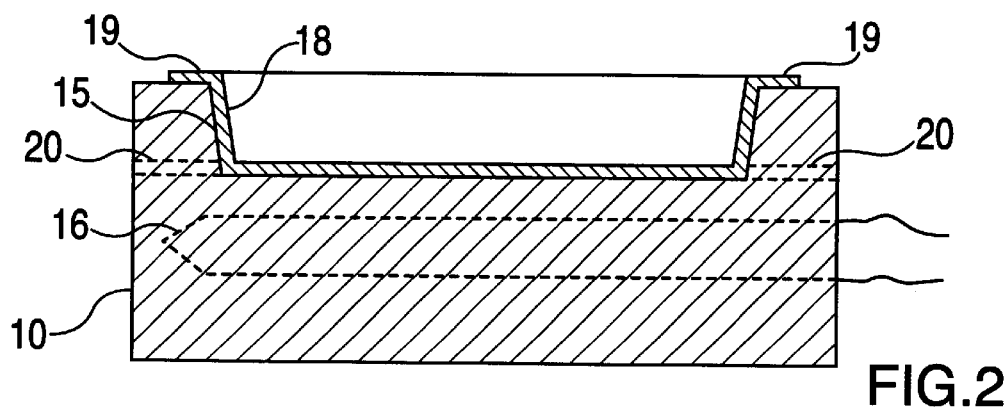
FIG. 2 is an enlarged vertical section of the bottom part of the apparatus of FIG. 1.

FIG. 2 is a vertical section of back-up mold 10 of FIG. 1 with an aluminum foil mold 18 set in cavity or recess 15. Recess 15 and foil mold 18 are shaped and dimensioned so that the outer surface of foil mold 18 contacts the surface of recess 15 as thoroughly as possible. Such close nesting of foil mold 18 in recess 15 ensures good heat transfer from back-up mold 10 to foil mold 18 and prevents distortion of foil mold 18 when food therein is being baked under compression. Foil mold 18 is formed with an outward flange 19 that stabilizes the shape of foil mold 18. After fluid food has been added to foil mold 18 and mold top 12 has been pushed down by cylinder 13 against back-up mold 10, foil flange 19 is held firmly between mold parts 10, 12. The term nesting or any variant thereof is used herein to connote a close fitting of the foil mold in the back-up mold like hand in glove. Some fluid foods can be deposited in the foil mold before it is nested in the back-up mold.

With mold top 12 pressing against back-up mold 10, the fluid food in foil mold 18 is heated to a desired high temperature, say 450° F., so that moisture and volatiles in the food generate gas pressure within foil mold 18. Gas pressure cannot be allowed to rise to a dangerous level. Flange 19 of foil mold 18 is invariably crimped so that both its top and bottom sides have fine grooves or creases through which steam and other volatiles can seep and help reduce the build-up of a dangerous pressure within the closed mold.

As previously mentioned, foil mold 18 usually has a multiplicity of needle punctures or fine perforations that can vent gases generated by the food that is being baked under compression. Gases leaving foil mold 18 can travel between foil mold 18 and recess 15, and escape along the interface of foil flange 19 and back-up mold 10. A few small holes 20 extending laterally through mold 10 to the bottom of recess 15 facilitate the venting of gases entering the interface of foil mold 18 with recess 15. Also as previously described, mold top 17 can be permitted to pop up for several successive instants when the food in the mold generates considerable steam.

Foil mold 18 containing a unified food product at the end of a chosen baking period can be lifted out of back-up mold 10 manually by getting a pinching grasp of foil rim 19. Many schemes for facilitating the removal of foil mold 18 and the baked food therein can be visualized. For example, a hole passing through mold 10 to a spot below foil mold 18 can be used to inject pressurized air and thus lift mold 18 at least partially out of recess 15.

Figure 3:
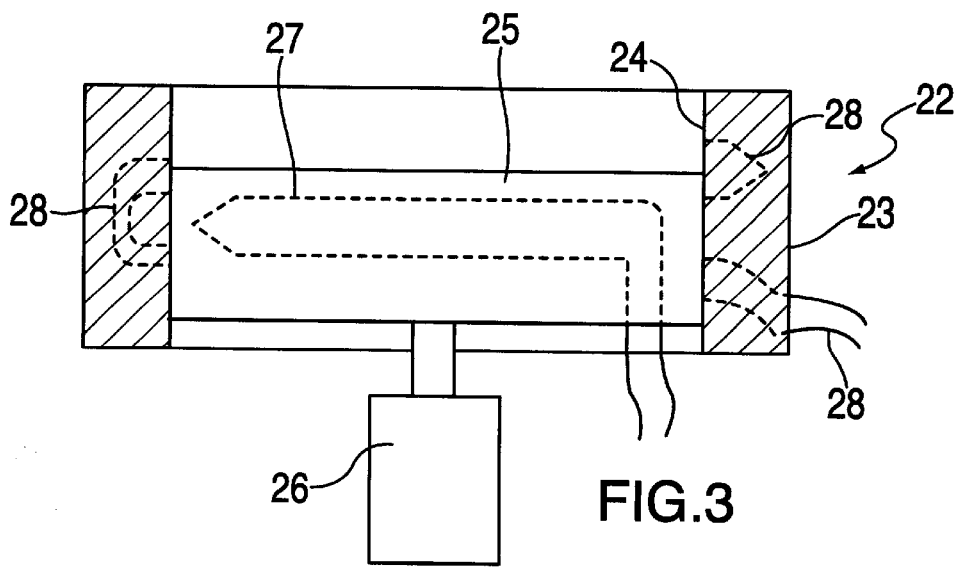
FIG. 3 is an articulated version of the bottom part of the apparatus shown in FIG. 2.

In FIG. 3, back-up mold 22 has two parts: a fixed block 23 with a large bore 24 in which block 25 can move up and down like a piston. Block 25 is mounted on the piston rod of pneumatic cylinder 26 which can push block 25 up so that the top surface of block 25 is flush with, or even above, the top surface of block 23. In short, a foil mold (not shown) placed in mold 22 as shown in FIG. 3 will be lifted out of mold 22 when block 25 is pushed up by cylinder 26. Reciprocating block 25 contains electrical heater 27. Fixed block 23 may also be equipped with a heater 28. The feature of two-part mold 22 of ejecting the foil mold containing a baked food product can also be achieved by holding block 25 stationary and reciprocating block 23.

Figure 4:
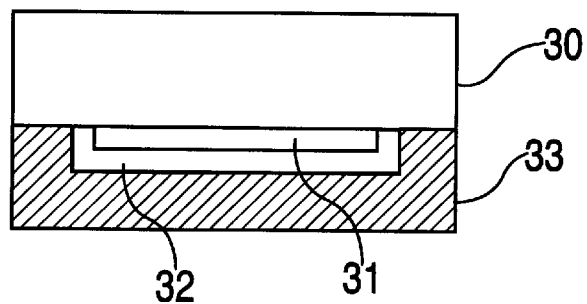
FIG. 4 is a vertical section of only the bottom part of the apparatus of FIG. 1 with a modified top part.

The molding face of mold top 12 of FIG. 1 is flat. With sticky foods the molding face should have a non-stick coating such as Teflon. FIG. 4 illustrates that the molding face of mold top 30 need not be flat. Specifically, mold top 30 has a protrusion 31 which dips into the recess 32 in back-up mold 33. Protrusion 31 is dimensioned to leave a desired space between it and the bottom of a foil mold (not shown) nested in recess 32 as well as all around it. Thus, the compressed and baked food product of mold top 30 and back-up mold 33 containing the foil mold has the form of a sheet with a thicker rim. If recess 32 and protrusion 31 are cylindrical, the baked food will have the shape of a pizza shell. Recess 32 and protrusion 31 may be elliptical, square, oblong, etc.

Figure 5:
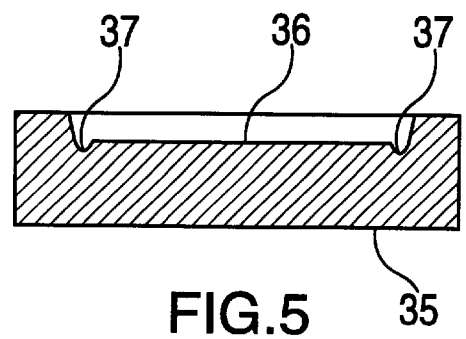
FIG. 5 is a vertical section of a modified bottom part of the apparatus of FIG. 1.

FIG. 5 shows that back-up mold 35 can have a recess 36 of any desired shape. The selected recess 36 has rim portion 37 which is deeper than the central part of recess 36.

Figure 6:
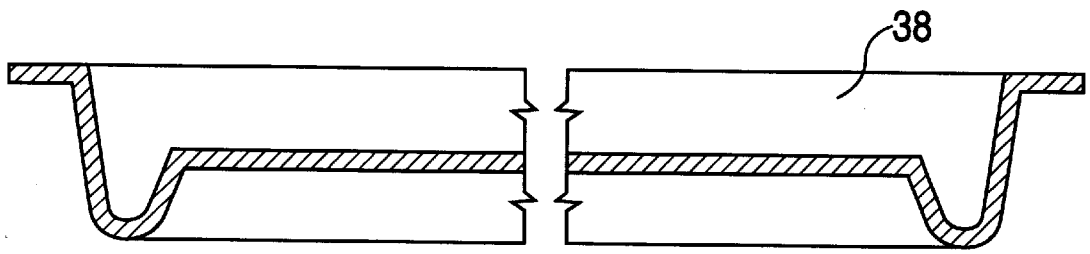
FIG. 6 is a vertical section of a novel aluminum foil mold used with the bottom part shown in FIG. 5.

FIG. 6 is a sectional view of preformed aluminum foil mold 38 shaped to nest in back-up mold 35 of FIG. 5. A circular form of foil mold 38 and a mold top like top 12 of FIG. 1 with a flat molding face can be used to produce upside-down pizza shells. The molding face of the mold top need not be flat; it may have a narrow, cylindrical protrusion that fits in, and dips into, foil Darn mold 38. The foil mold 38 will protect the pizza shell during handling and shipment. When the pizza shell is to be garnished with tomato sauce, cheese and like ingredients, the foil mold 38 is inverted to release the pizza shell with its flat side down so that the shell can be trimmed with desired condiments.

Even foil mold 38 of FIG. 6 or any other foil mold having a recess that is not simply flat can be used with a two-part back-up mold like mold 22 of FIG. 3 provided the molding face of reciprocating block 25 has a contour matching that of the foil mold. Foil mold 38 is ideally suited for producing pizza shells of all diameters, usually in the range of 6 to 16 inches, on a rapid, continuous basis. The foil mold facilitates handling of the pizza shell and protects it against damage during shipment. Foil mold 18 of FIG. 2 when used with mold top 30 of FIG. 4 will also yield a pizza shell that will be protected until foil mold 18 is removed. Pizza shells produced in foil molds 18 and in molds 30, 33 of FIG. 4 can be garnished, reheated and served without first removing foil mold 18. Thus, foil mold 18 can also eliminate the need for a serving dish.

Pizza shells produced under compression, either face up or upside-down, in accordance with this invention are especially enjoyed by gourmets when formed of cooked spaghetti, linguini, fettucini and the like with an edible binding agent such as eggs or egg whites. The cooked pasta and admixed binding agent may also contain spices, herbs and other ingredients when placed in the foil mold before being baked under compression to form the unusual pizza shell. As is well known, a pizza shell has the shape of a pancake with a thick rim.

Variations and modifications of the invention will be apparent to those skilled in the art without departing from the spirit or scope of the invention. For example, two different fluid foods, such as cooked pasta and rice may be deposited in the foil mold, side by side as separate gobs, to form, when compressed and baked, a unified product, having a pasta portion joined to a rice portion. Also, the back-up mold may have two or more cavities for the placement of a foil mold in each so that two or more unified products are formed in each compression and baking cycle. Accordingly, only such limitations should be imposed on the invention as are set forth in the appended claims.

What is claimed is:

1. An apparatus for compressing and baking fluid food under pressure in a preformed, aluminum foil mold to form an edible, unified product, which comprises a heated two-part, back-up mold for said foil mold, an inner part of said back-up mold being laterally surrounded by an outer part and one of said parts being movable up and down while the other of said parts is stationary so that alternately said two parts form a recess in which said foil mold is nested and then said two parts dislodge said foil mold, and a heated mold top that can be pressed down against said outer part of said back-up mold while said foil mold with fluid food therein is nested in said recess for a baking period selected to convert said fluid food into said unified product.

2. The apparatus of claim 1 wherein the back-up mold and the mold top are made of aluminum and both have electrical heaters.

3. The apparatus of claim 2 wherein one part of the back-up mold and the mold top are each connected to a hydraulic or pneumatic cylinder for the up-and-down movement of each.

4. The apparatus of claim 2 wherein the inner part of the back-up mold and the mold top are each connected to a hydraulic or pneumatic cylinder for the up-and-down movement of said inner part and said mold top.

5. The apparatus of claim 4 wherein the recess formed by the two-part back-up mold has the shape of a shallow pan, and the mold top has a smaller pan-shaped protrusion that extends into said recess with the surface of said protrusion spaced from the surface of said recess when said mold top is pressed down against the outer part of said back-up mold.

6. The apparatus of claim 4 wherein the recess formed by the two-part back-up mold has the shape of an upside-down pizza shell, and the mold top has a flat surface.

* * * * *